(No Model.) 2 Sheets—Sheet 1.

E. McDONALD & P. McHUGH.

DEVICE FOR FLUSHING WATER CLOSETS.

No. 467,516. Patented Jan. 26, 1892.

Attest

Wm. E. Jones

K. Smith

Inventors:

Edward McDonald and Patrick McHugh per Wm. Hubbell Fisher, Atty.

THE NORRIS PETERS CO., PHOTO-LITHO., WASHINGTON, D. C.

E. McDONALD & P. McHUGH.
DEVICE FOR FLUSHING WATER CLOSETS.
No. 467,516. Patented Jan. 26, 1892.
Fig-5-
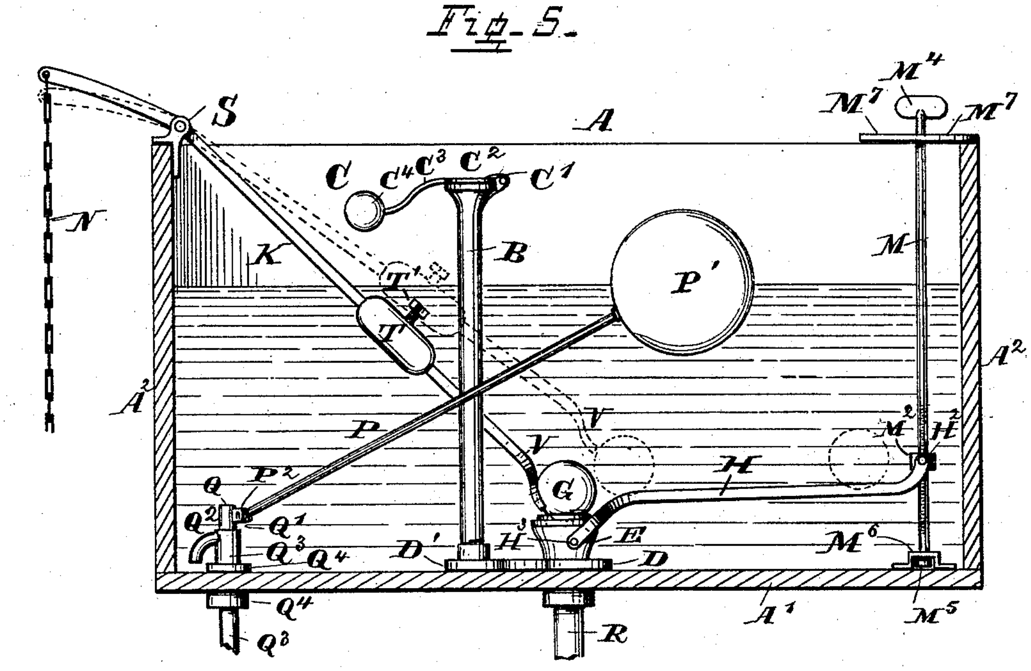
Fig-6-
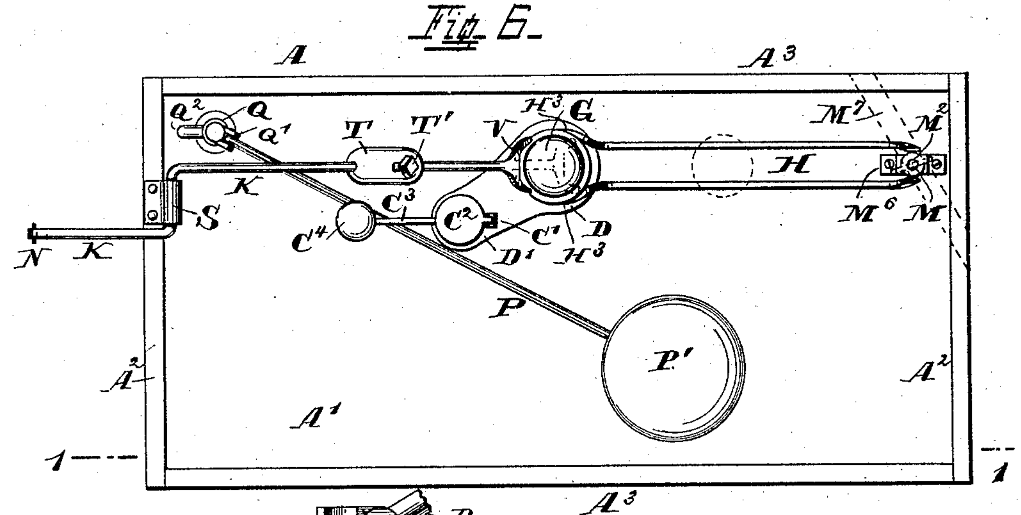
Fig.7
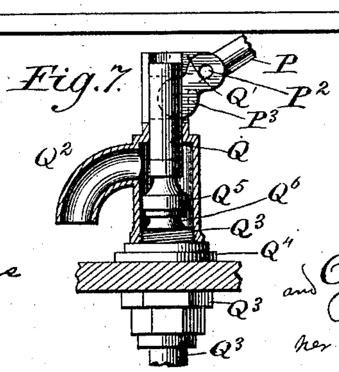
Attest
Wm. E. Innes
K. Smith
Inventors:
Edward McDonald
and Patrick McHugh
per Wm. Hubbell Fisher, Atty.
THE NORRIS PETERS CO., PHOTO-LITHO., WASHINGTON, D. C.

UNITED STATES PATENT OFFICE.

EDWARD McDONALD AND PATRICK McHUGH, OF CINCINNATI, OHIO; SAID McHUGH ASSIGNOR TO SAID McDONALD.

DEVICE FOR FLUSHING WATER-CLOSETS.

SPECIFICATION forming part of Letters Patent No. 467,516, dated January 26, 1892.

Application filed July 2, 1890. Serial No. 357,540. (No model.)

*To all whom it may concern:*

Be it known that we, EDWARD McDONALD and PATRICK McHUGH, both citizens of the United States, and residents of the city of Cincinnati, in the county of Hamilton and State of Ohio, have invented certain new and useful Improvements in Devices for Flushing Water-Closets, of which the following is a specification.

The several features of our invention and the various advantages resulting from their use, conjointly or otherwise, will be apparent from the following description and claims.

Figure 1:
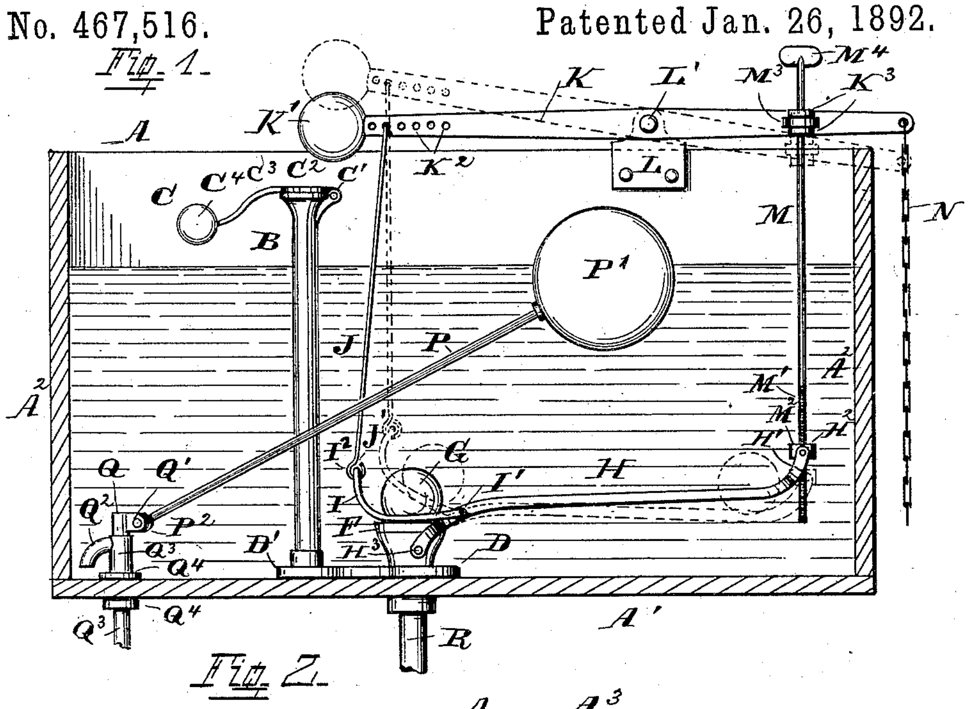
Figure 2:
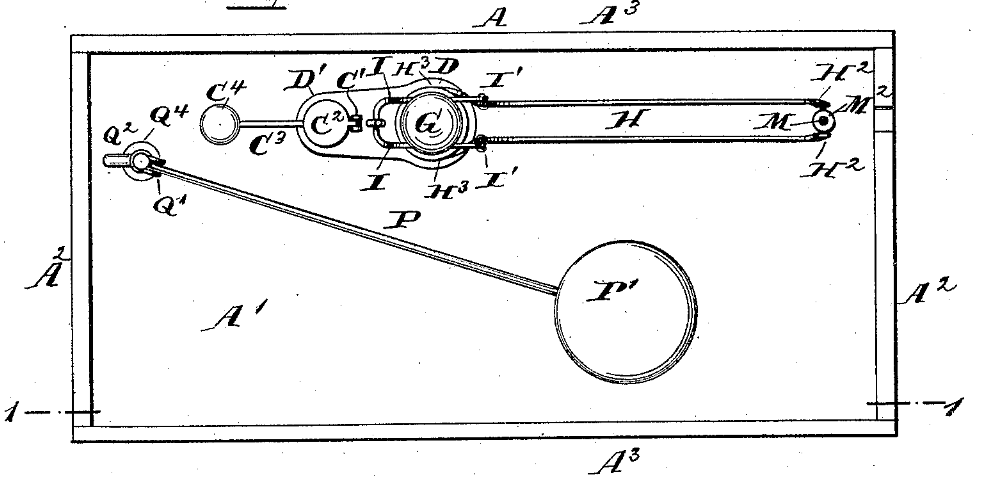
Figure 3:
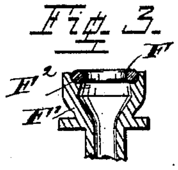
Figure 4:
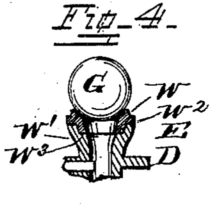

In the accompanying drawings, making a part of this specification, and to which reference is hereby made, Figure 1 is a vertical section of a tank provided with our improvements. This section is taken in the plane of the dotted line 1 1 of Fig. 2, and the spectator is looking toward that side of the section which is toward the top of the sheet of drawings. This view is, in effect, a side elevation of the mechanism directly connected to the tank and also of that which is within and above the latter. Fig. 2 is a plan view of the said tank and of the mechanism which it contains, the upper lever being omitted and the upper end of each of the two operating-rods connected with said lever being broken off, these omissions being made to disclose the mechanism in the tank below the lever. Fig. 3 is a vertical central section of the preferred description of valve-seat employed in connection with the ball-valve. Fig. 4 is a vertical central section of a modified description of valve-seat. Fig. 5 is a vertical section taken in the same plane as was the section shown in Fig. 1, the view illustrating in side elevation certain modifications of portions of the mechanism shown in Figs. 1 and 2. Fig. 6 is a plan view of the tank and its accompanying mechanism shown in Fig. 2. Fig. 7 is a view, partly in vertical central section and partly in elevation, of one form of device whereby the tank when partly or wholly emptied shall be automatically refilled with liquid.

Our improvements are applicable to flushing various devices of pipes. As the cleansing of the pipes of water-closets is one of the operations for which devices for flushing are most frequently applied, we will therefore, for the purposes of illustration, describe them in connection therewith.

A indicates a tank of any suitable form. In the present instance the tank is rectangular and consists of a bottom A′, ends $A^2$ $A^2$, and sides $A^3$ $A^3$. The tank is, for convenience, provided with a suitable device whereby the tank when partly or wholly emptied shall be automatically refilled with water or other liquid employed. One kind of such device is shown, and consists of the supply-pipe $Q^3$, whose discharge end is located within the tank and is there provided with a delivery-spout $Q^2$. The pipe $Q^3$ is secured to the bottom of the tank by the nuts $Q^4$ $Q^4$. The communication between the supply-pipe and the delivery-spout is controlled by a valve Q, operated by a lever P, having a pivotal fulcrum at $P^2$ in the ears Q′ of the valve Q. The adjacent end $P^3$ of the lever P works in a slot in the upright shank $Q^5$ of the valve Q. The free end of the lever P is provided with a hollow float P′. As the water runs out of the tank the float P′ falls and elevates end $P^3$ of lever P, and thus raises valve-shank $Q^5$ and valve Q from its seat $Q^6$ and the supply-pipe $Q^3$ discharges water into the tank. When the tank has been filled to the desired height, the rise of the float depresses the end $P^3$ of lever P, and thereby through the intermediate agency of shaft $Q^5$ seats the valve Q on its seat $Q^6$ and shuts off the supply of water. Further description and mention of such a well-known device is deemed unnecessary. The tank is likewise preferably provided with an overflow-pipe, so that in case the device for automatically shutting off the inflow of water ceases to act or for any other reason the water in the tank should continue to rise above the desired and proper height in the tank the overflow-pipe will take off the surplus water rising in the tank above the said proper height. In the present instance the pipe B serves as an overflow-pipe and passes down through the bottom of the tank and discharges below the said bottom. In case the exit end of said pipe joins the pipe R, which is to convey water from the tank to the pipes or basin, &c., to be flushed, then the top or upper portion of the said pipe B is provided with a valve, whereby when the said pipe B is not in use in carrying off the surplus water in the tank arising from the failure of the valve Q to act properly the said pipe B shall be closed and the entrance of air thereto shall be prevented. If the said pipe B were not provided with such a valve, a disagreeable gurgling noise would be produced whenever a discharge of water from the tank took place through the discharge-pipe.

A preferred description of valve already in common use with such a pipe B is shown in Figs. 1 and 2, and consists substantially as follows, viz: The valve $C^2$ rests upon the valve-seat at the upper end of the pipe B. One side or edge of this valve is provided with an ear or lug, which is pivoted at C′ to a lug or lugs connected to pipe B. To that side of the edge of the valve $C^2$ which is opposite to the point C′ is connected one end of an arm $C^3$, and the other or free end of this arm $C^3$ is provided with a float $C^4$, the preferred description of float being a hollow ball, as shown. The proper level of the surface of the water in the tank is shown in Fig. 1. When by reason of the non-action of the valve Q the latter fails to close when the water has reached the level shown and the water continues to rise in the tank, the float $C^4$ will be lifted and the valve $C^2$ raised and the water in the tank will find exit through the pipe B. As soon as the water in the tank falls, the float $C^4$ will descend and the valve $C^2$ close.

We will now proceed to describe the mechanism which embodies the various features of our invention. The discharge-pipe R is provided at its upper end with the valve-seat E. The preferred construction and form of such seat is that shown in Fig. 3, and consists of the lower rigid portion F′ and the elastic ring F of rubber or other elastic material. The interior of the upper portion of the portion F′ is hollowed or recessed at $F^2$ to receive a portion of the outer and lower annular edge of the elastic ring. Upon and within this ring F rests the ball-valve G when located on said valve-seat E. In Fig. 4 is shown a modified construction of said valve. In this case the valve-seat E is composed of a lower portion W′ and an upper portion W. The upper portion is made of rubber, and its upper edge is in plan view of an annular shape, and is concave in cross-section, its edge being adapted in shape to closely fit the surface of the spherical ball-valve G, which rests upon it when the valve is closed. This upper elastic portion W of the valve-seat is preferably secured in position on the basal part W′ of the valve, as follows, viz: The upper portion of the base W′ is interiorly cut away so as to leave an outlying vertical flange $W^2$ and an inner annular piece $W^3$. The lower portion of the rubber seat W is formed to closely fit the recess formed by and within the flange $W^2$ of the base, and at the same time rests upon and is supported by an annular seat $W^3$. Thus by means of the flange $W^2$ the rubber seat is prevented from lateral displacement, and at the same time is supported upon the annular base $W^3$ and the upper edge of the flange $W^2$.

The valve-seat E is located within the tank A, and the preferred means of connecting it to the tank consists of the base-plate D integral with the said valve. The pipe B is preferably secured to the bottom of tank A by a base D′. The discharge-pipe R is suitably secured to the bottom of the base D′, the orifice of the pipe R communicating directly with the orifice which is present in the center of the valve-seat E. The base D D′ may contain a passage-way and this passage-way connect with the orifice of pipe B and the orifice of the valve-seat. Such is the case in the present illustrative instance.

The ball-valve G may be made of any desired hard material. The material of the valve should, moreover, be heavier than the liquid in the tank; or if lighter than the said liquid the interior of the spherical valve should be loaded or weighted until the specific gravity of the ball is greater than that of the liquid of the tank. The ball-valve G may be covered with an external coat of rubber or other elastic material. In such event the elastic seating, as F or W, of the valve-seat may be omitted and a hard seating be substituted therefor, the elastic covering of the valve furnishing the elastic packing or medium for rendering the junction between the valve and the valve-seat water-tight.

A runway or track H is present within the tank A. This runway is to receive the ball and to allow the same to run or slide thereon. In the preferred description of mechanism the runway consists of two guide rods or tracks H H substantially parallel. Each of these guide-rods H H is pivoted to the valve-seat E or an equivalent support. One of the guide-rods is pivoted at $H^3$ at one side of the valve-seat and the other is pivoted at $H^3$ at the other side of the valve-seat. To the other end of each of the said guide-rods H H is connected a supporting-rod M, substantially vertical and connected to a lever K, located at or near the top of the tank. The connection between the supporting-rod M and the guide-rods H H is a pivotal one.

The valve-throwing device consists of the U-piece—viz., the two parallel rods I I, connected together at their rear end. The forward ends of this valve-throwing device are pivotally connected on a suitable support. The preferred place for such connection is as shown, viz: One end of each of these rods is pivoted at I′ to the adjacent guide-rod H. The rods I I, when the valve is closed, rest down upon or close to the top of the valve E and the ball-valve G rests upon the seat F. The ball is of greater diameter than the width between the rods I I. Hence the sides of the ball, when it rests upon the seat F, extend over and beyond the rods I I. At or near the point of junction of the rods I I the said yoke-piece is pivotally connected to a rod J by means of a suitable pivotal connection, one form of which is shown and consists of an eye J′, attached to the lower end of the rod J and inclosing the rear end $I^2$ of the yoke which forms the valve-throwing device. The upper end of this rod J is connected to the lever K aforementioned. This lever K is pivotally supported at or near its center on a fulcrum-pivot L′, upheld by a support, as L, connected to the tank, or a suitable adjacent fixture. It will be observed that the rod J is attached to the lever on one side of the support L, while the supporting-rod M is attached to the said lever at the opposite side of the said support L. That arm of the lever K to which the rod J is attached is weighted in a suitable manner, preferably by means of a ball or weight K′, secured to the lever, as shown. The other end of the lever K extends beyond the rod M and the tank, and to this extremity of it is connected a chain or cord N within reach of the person whose duty it is to start the operation of flushing the pipe of the closet or basin or other receptacle to be flushed.

The mode in which our device operates in general is as follows: When it is desired that the pipe R shall discharge its contents for the purpose of flushing, as aforementioned, the operator draws down the cord or chain N. This movement depresses the adjacent end of the lever K and lowers the rod M, and with it that end of the runway H to which it, the said supporting-rod M, is attached. That end portion of the runway H which is adjacent to the rod M will then be lower than the other end of the runway which is adjacent to the valve-seat and ball-valve. As that end of the lever K which is connected to the chain N descends, as aforementioned, the free end of the lever K will be elevated and will raise the rod J. The latter in turn raises the adjacent end of the yoke-piece or ball-throwing device I and throws the ball G over onto the runway or track H. The ball will immediately run down the said guideway H to that end of the guideway which is next to the rod M. The valve-seat E, being thus uncovered, admits water from the tank, which water passes down through the discharge-pipe R and flushes the closet, basin, or other receptacle to be flushed. The operator now ceases to pull down the cord or chain N, and the adjacent end of the lever K will rise and the weighted end thereof fall. This movement of the lever raises the rod M and that end of the runway which is adjacent thereto, so that the said end will now be higher than that end which is adjacent to the guideway. The ball-valve G will now return down along the guideway H, and as the depression of the weighted end of the lever K has depressed the rod J and the valve-thrower I, so that the lower portion thereof is now upon or near to the valve-seat E, the valve G will run upon and seat itself upon the valve-seat. The upturned end of the valve-thrower I near I′ prevents the ball, after returning from rod M on the runway H, from running farther than the valve-seat.

The amount of water to be discharged through the pipe R is automatically regulated by devices which form certain features of our invention and which devices we will now describe.

The rapidity with which the ball-valve G will return along the runway H after having reached the end of the latter adjacent to the rod M will depend upon the degree of inclination of the runway H from the rod M down to the valve-seat E. This inclination of the runway H is adjusted by making the connection between the runway H and the rod M adjustable. A preferred means for obtaining such adjustment is as follows, viz: The ends of the guide-rods H H are pivoted at $H^2$ to a nut $M^2$. The lower portion of the supporting-rod M is provided with a screw-thread M′, and this screw-thread engages the interior screw-thread on the nut $M^2$. The upper end of the rod M above the lever is provided with a thumb-lever or hand-wheel $M^4$. The rod M is supported on a lug $M^3$, secured to the lever K. The rod M passes through this lug $M^3$. Just above this lug $M^3$ is an annular projection $K^3$, and just below the lug $M^3$ is another annular projection $K^3$. Both of these projections are fixed to the rod M. Thus the rod M is free to rotate in the lug $M^3$; but all vertical motion of the rod M, apart from the lever K, is prevented. By turning the rod M forward one direction the nut $M^2$ is lifted, and with it the adjacent end of the runway H. When such adjustment is made, the ball-valve G, after having reached the rod M, will return more rapidly to the valve-seat E and will sooner cut off the supply of water from the tank to the exit-pipe R. By turning the rod M in a contrary direction the nut $M^2$ and the adjacent end of the runway H is lowered, and the valve G, after having reached the rod M, will return more slowly toward the valve-seat E, and consequently a larger supply of water for flushing will be furnished to the pipe R by the seat E before the valve reaches the said valve-seat E and prevents the further egress of water from the tank.

We have also made provision whereby the valve-throwing device may also be adjusted, so as to throw the valve with a greater or less degree of force from the valve-seat along the track toward the free end of the track. This adjustment enables us to further regulate the time of the discharge of water from the tank through the pipe R. The preferred mode of such adjustment consists in a provision whereby the upper end of the rod can be attached at various points along the lever K. Thus the lever K is provided with a series of openings $K^2$, and the upper end of the rod J is bent at right angles to the axis of its general length, and said end is placed in any one of the said openings $K^2$, as desired. As arranged, the nearer the end of the rod K is located in lever K toward the fulcrum L′ of the latter the shorter will be the stroke of the rod J and the less elevation will be imparted to the free end of the valve-throwing device I and the less impetus will be given to the ball-valve.

In Figs. 5 and 6 we have shown a modification of certain portions of our invention. Here the track or runway H is not elevated at each movement of the valve. Nevertheless its free end is capable of vertical adjustment by means of the rod M and nut $M^2$, as aforementioned. The rod M, instead of being connected to the lever for throwing the ball-valve and rising and falling therewith, has no vertical movement, but retains its capacity for rotation by means of the thumb-wheel $M^4$. The lower end of the rod is provided with a head $M^5$, turning beneath and held down by a clamp $M^6$, fixed to the bottom of the tank. The upper end portion of the rod M passes through and is journaled in a bearing $M^7$, secured to the upper part of the tank. The lever for throwing the ball-valve is pivoted at the opposite end of the tank on fulcrum-pivot S, fixed to the tank or other suitable support. The lower end of this lever has a fork or device for receiving the ball and throwing it forward. In order to return this lower end of the lever rapidly to its position of the valve-seat after having impelled the ball up the runway H, that arm of the lever K next the valve G is made heavy, and the preferred mode of weighting it is by providing it with an adjustable weight T, as shown. This weight T embraces and slides on the lever K, and is set at any desired place on the lever K by means of the set-screw T′.

While the various features of our invention are preferably employed together, one or more of the said features may be employed without the remainder, and in so far as applicable one or more of said features may be used in connection with devices for flushing-pipes, &c., other than the one herein specifically set forth.

What we claim as new and of our invention, and desire to secure by Letters Patent, is—

1. The combination of the ball-valve, valve-seat, and the inclined runway for the ball-valve adjacent at one end to the valve-seat, and a device for throwing the ball-valve along the runway, substantially as and for the purposes specified.

2. The combination of the ball-valve, valve-seat, the inclined runway, said runway being pivoted at its end near the valve-seat and having its other end free to be raised or lowered to make the desired inclination of the runway, and a device for throwing the ball-valve, substantially as and for the purposes specified.

3. The combination of the lever and the ball-valve thrower, ball-valve and valve-seat, and a runway for the ball-valve, substantially as and for the purposes specified.

4. The combination of the lever and the ball-valve catcher, and a runway for the ball-valve, and a valve-seat and ball-valve, the end of the runway next the valve-seat being pivotally supported, and the rear or free end being provided with a device for adjusting the height of said free end of said runway, substantially as and for the purposes specified.

5. The combination of the valve-seat, ball-valve, nut $M^2$, and the vertical screw-rod M, runway pivoted at its end next to the valve-seat and at its other end pivoted to the said nut $M^2$ and engaging the said screw-rod M, and a device for throwing the ball along the guideway, substantially as and for the purposes specified.

6. The combination of the valve-seat, ball-valve, rod M, runway pivoted at its end next the valve-seat, its free end pivotally connected to the supporting-rod M, a lever K, chain N, and fulcrum L′ of said lever, the runway being connected near one end to rod M and at the other end connected to the valve-seat, the rod J, and the ball-throwing device I, pivoted at one end to the said rod J and at the other end pivotally supported in the neighborhood of the valve, substantially as and for the purposes specified.

7. The combination of valve-seat, ball-valve, runway for said valve, pivoted at one end by the valve-seat, and lever K, working on a fulcrum-pivot and operated by chain N and supporting the rod M and rod J, the rod M being screwed to nut $M^2$, in turn pivoted to the adjacent end of the runway, and ball-valve-throwing device I, pivoted by the valve-seat, and the rod J being pivotally connected to lever K and the adjacent end of the device I, substantially as and for the purposes specified.

8. The combination of the valve-seat, ball-valve, runway for said valve, pivoted at one end near the valve-seat, and lever K, working on a fulcrum-pivot and supporting the rod M and rod J, the rod M being pivotally connected to the said runway, and the ball-throwing device I for throwing the ball along the guideway, supported at one end by rod J, the rod J being connected adjustably to the lever K by means of the openings in said lever, substantially as and for the purposes specified.

9. The combination of the valve-seat, ball-valve, runway for said valve, pivoted at one end by the valve-seat, and lever K, working on a fulcrum-pivot and operated by chain N and supporting the rod M and rod J, the rod M being screwed to nut $M^2$, in turn pivoted to the adjacent end of the runway, and ball-valve-throwing device I, pivoted by the valve-seat, the rod J being pivotally connected to lever K and the adjacent end of the device I, the rod J being adjustable on the lever K for shortening the stroke of the rod J, substantially as and for the purposes specified.

10. The combination of the valve-seat, ball-valve, runway H, pivoted at $H^3$ to the valve-seat and at the other end supported by rod M, and the valve-throwing device I, pivoted at one end at I′ to the runway H and at the other end to the supporting-rod J, and lever K, pivotally connected to the rods M and J, substantially as and for the purposes specified.

11. The combination of the valve-seat, ball-valve, runway H, pivoted at $H^3$ to the valve-seat and at the other end supported by rod M, and the valve-rod-throwing device I, pivoted at one end at I′ to the runway H and at the other end to the supporting-rod J, and lever K, pivotally connected to the rods M and J, the runway being connected to the rod M by the nut $M^2$, engaging a screw-thread on said rod and pivotally connected to the end of the runway, and the lever K having provisions at different points for the connection thereto of the rod J, substantially as and for the purposes specified.

12. The combination of the valve-seat, ball-valve, runway H, pivoted at $H^3$ to the valve-seat and at the other end supported by rod M, and the valve-throwing device I, pivoted at one end at I′ to the runway H and at the other end to the supporting-rod J, and lever K, pivotally connected to the rods M and J, the runway adjacent to rod M being curved upward and the end of the throwing device being also curved upward, substantially as and for the purposes specified.

EDWARD McDONALD.
PATRICK McHUGH.

Attest:
K. SMITH,
GIDEON C. WILSON.